United States Patent Office 3,222,081
Patented Dec. 7, 1965

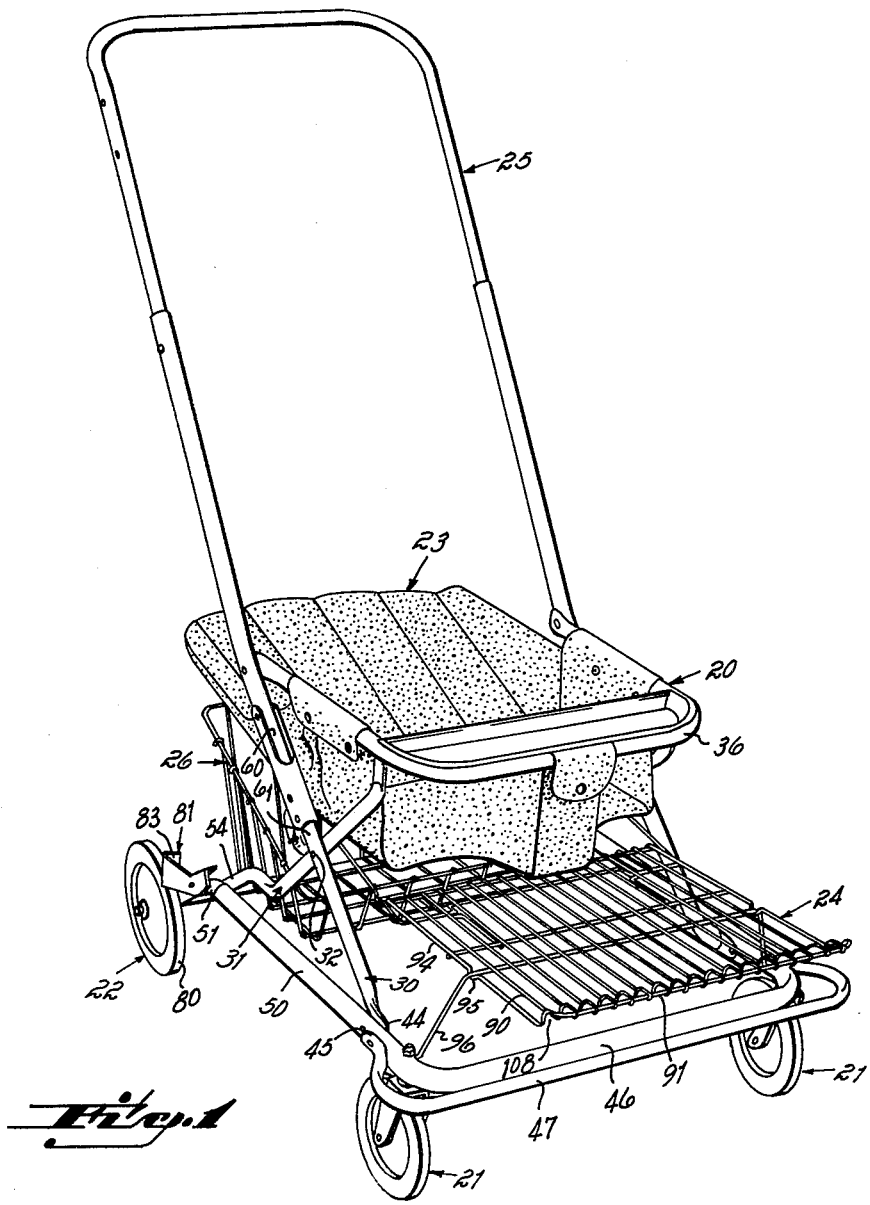

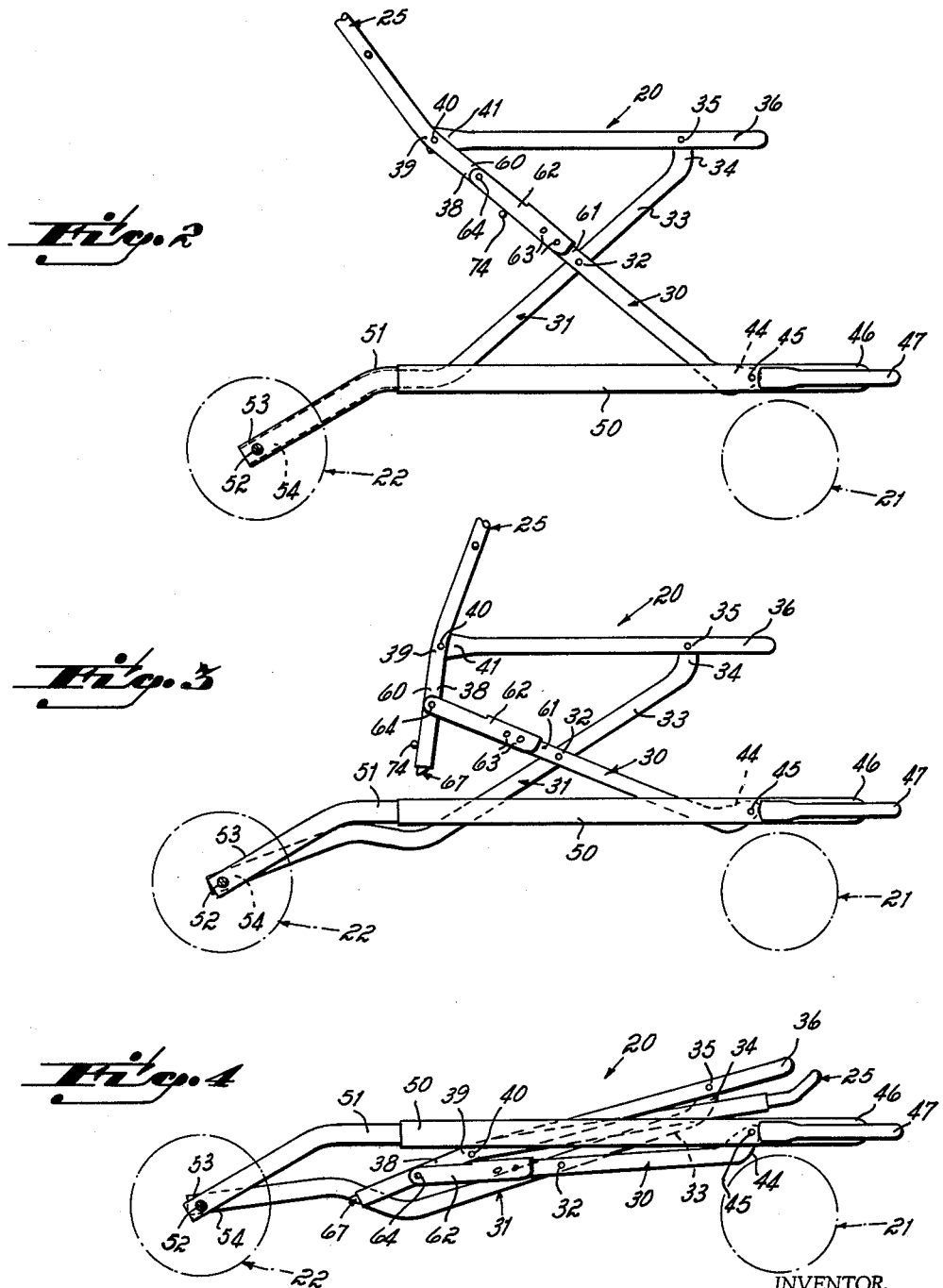

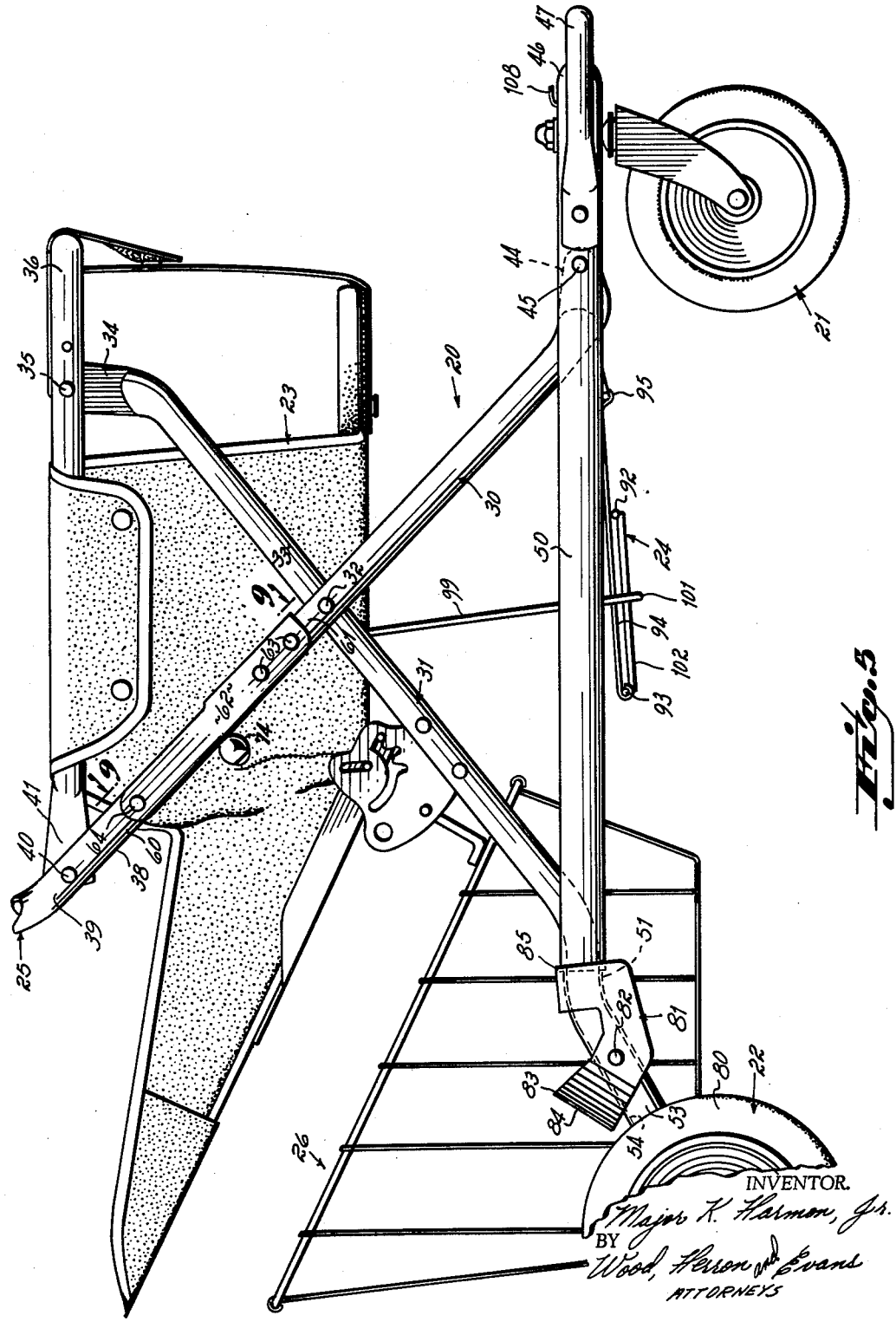

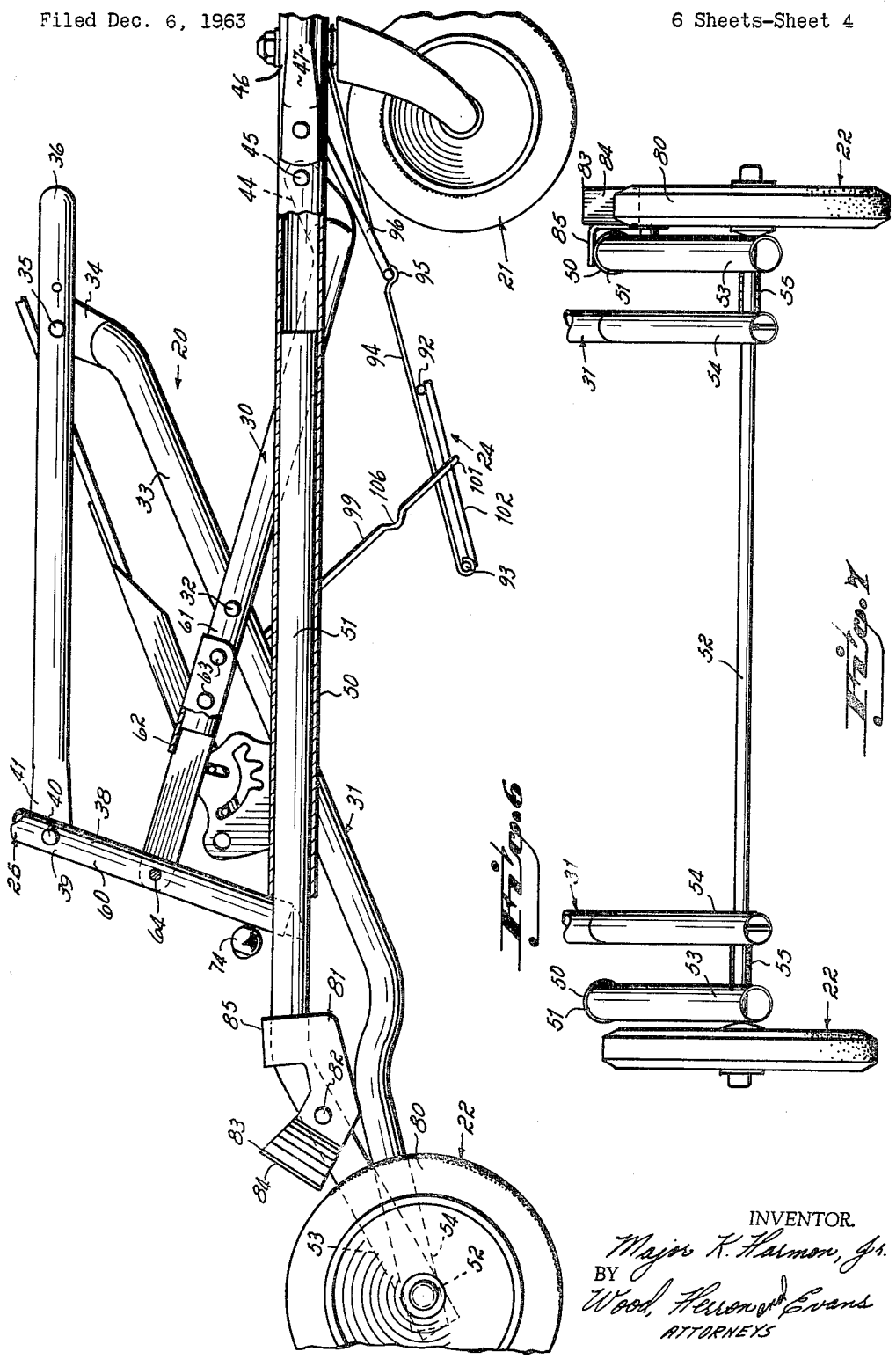

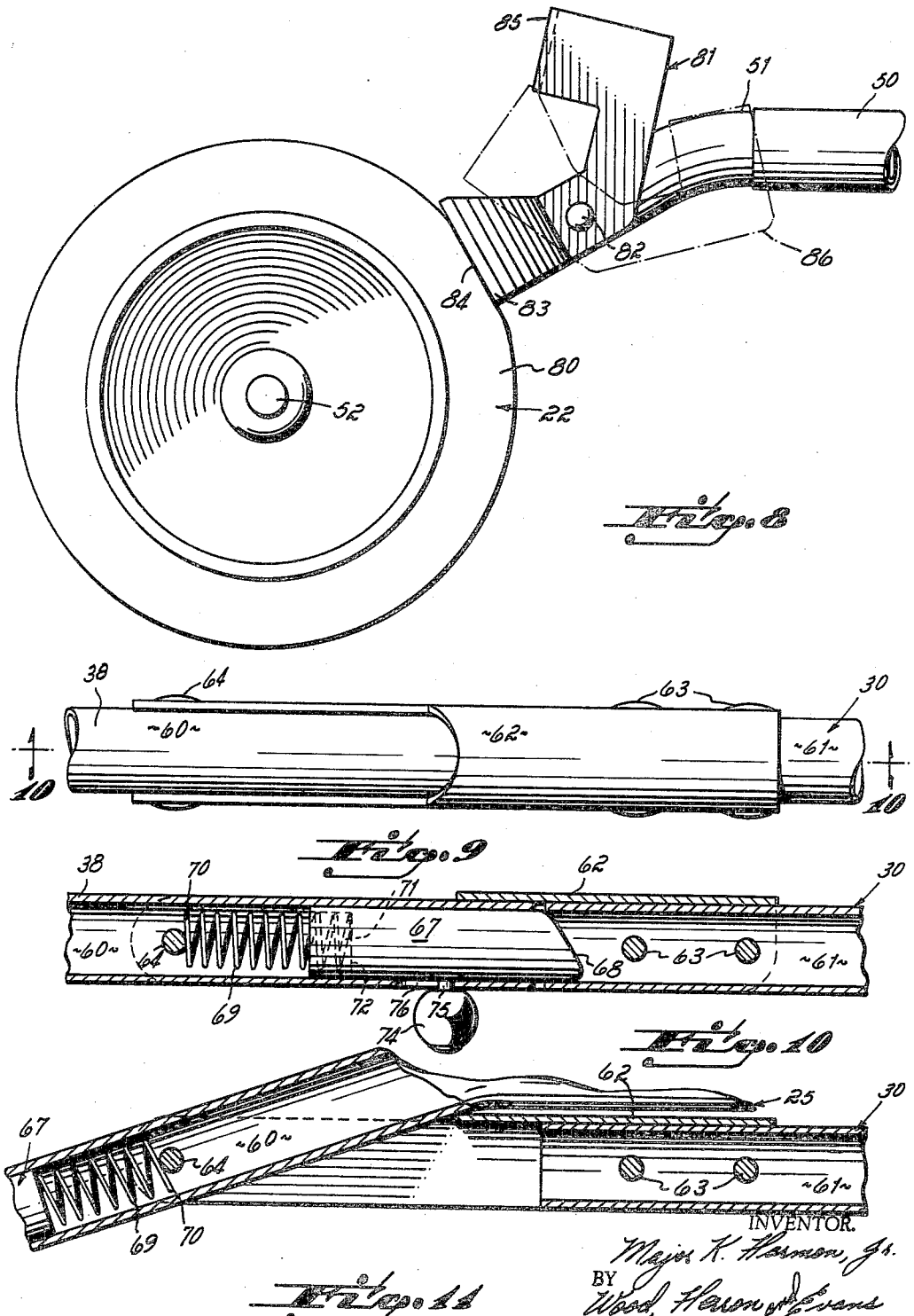

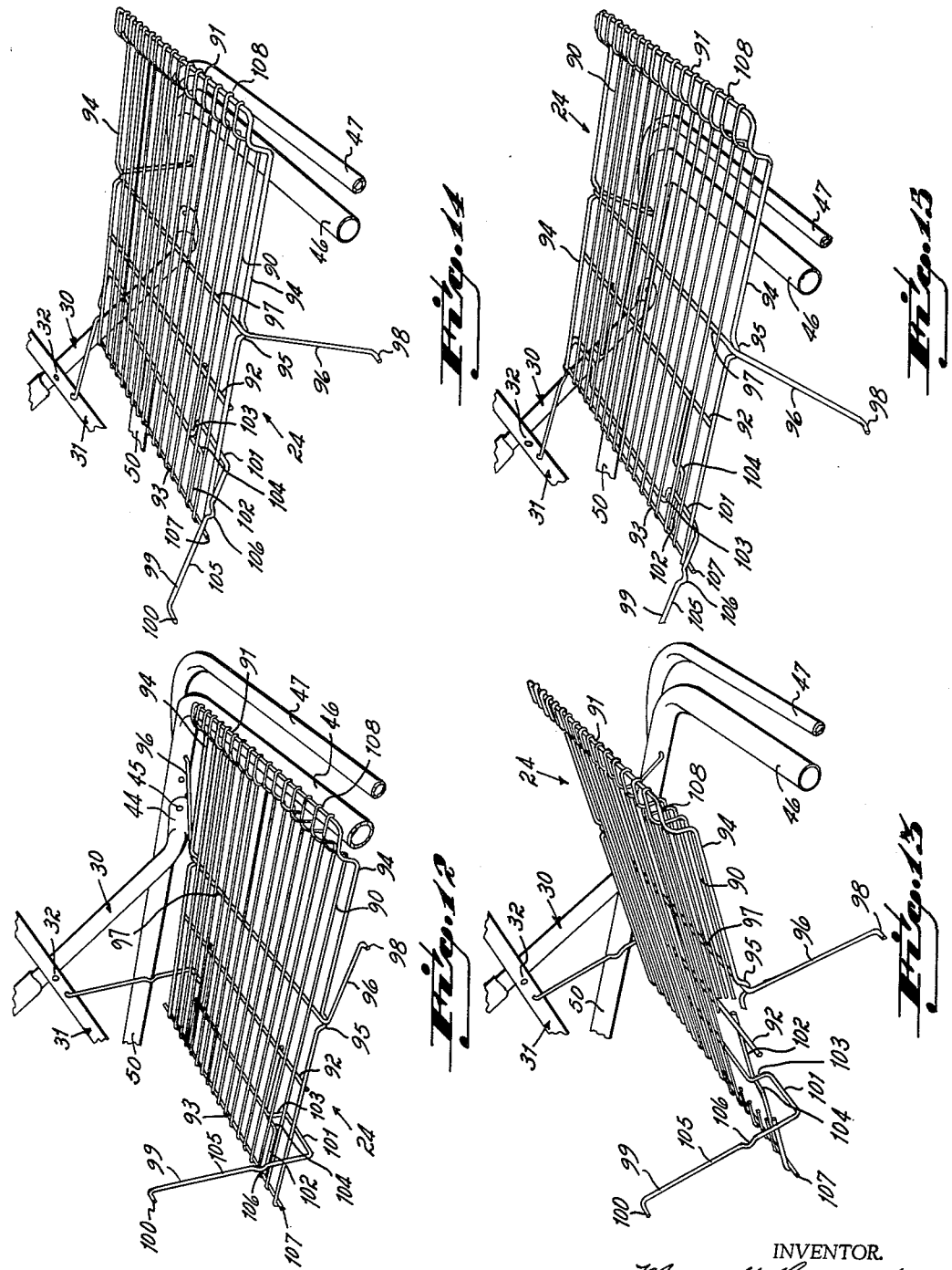

3,222,081
WALKER STROLLER
Major K. Harmon, Jr., Cincinnati, Ohio, assignor to The Frank F. Taylor Company, Cincinnati, Ohio, a corporation of Ohio
Filed Dec. 6, 1963, Ser. No. 328,597
3 Claims. (Cl. 280—36)

This invention relates to a walker stroller.

A walker stroller is a small vehicle which is used by an adult to propel a child in a sitting or comfortably reclining position. In addition to a seat for carrying the child, provision is usually made for a removable footrest having a lower position for the child as he sits up and having an elevated position which enables the child to recline with his legs outstretched. The footrest is normally removable so that as the child grows older he can propel himself about by pushing his feet against the ground.

There are a number of necessary or at least desirable features which must be incorporated into the walker stroller design in order for it to be acceptable as a useful article. Principal among these is the characteristic of ruggedness which enables the walker stroller to withstand the rigors of rather hard usage. It is not unusual for a family to have more than one child and to use the walker stroller acquired for the first child with all subsequent children. Not only is the walker stroller used a great deal in this manner, but additionally it is not unusual for the older, but still small, children to wheel the walker stroller around carrying either their dolls or siblings. That use of the walker stroller is somewhat less than careful and normally involves banging of the walker stroller into obstacles encountered during the play. For a walker stroller to have a long, useful life, it must be structurally sound and able to withstand such usage.

Another feature of the walker stroller which has practically become a necessity is the ability of the walker stroller to be folded from an upright normal condition to a substantially flat condition in which it can be transported or conveniently stored. This feature requires the pivoting of most of the structural elements with respect to each other with the pivot pins forming the locus of stress concentration. Because of the hard usage which the walker stroller receives, it is not unusual for the structural failure of the stroller to occur at the pivoted joints.

Several walker stroller designs employ legs which are crossed in scissors fashion and pivoted intermediate their ends, the ends of the legs supporting wheels on which the walker stroller is rolled. It is the intermediate pivot pin interconnecting the crossed legs which receives the greatest concentration of stress and which is most likely to fail. If it does not fail, the joint at least becomes so loose as to make the entire structure rather wobbly.

An objective of the invention has been to provide a walker stroller having as its principal elements legs which are crossed in scissors fashion, the lower ends of the legs being jointed together by a horizontal frame member. The horizontal member absorbs much of the shock and vibration which the stroller receives as it is being used. This shock absorptive characteristic greatly relieves the concentration of stress on the rivet joining the crossed legs and therefore acts to increase the useful life of the stroller to a great extent. Thus, the requirement of rugged construction is satisfied.

It has been another objective of the invention to provide a shock absorbing horizontal frame member in the walker stroller of the type described above, the frame member including telescoping side tubes which permit the walker stroller to be folded to a flat condition as well as to an upright, erect condition suitable for normal use.

Another area of concern in the walker stroller is the footrest. As indicated above, the footrest should be removable and it should be adapted to be easily shifted from a lower position to an upper position, and when shifted to an upper position it should remain in that position against inadvertent jarring. It has been an objective of the present invention to provide a footrest which is shiftable from the lower to the upper position merely by pulling up and forward on the front end of the footrest. The footrest can be locked in the upper position by pulling it forward an inch or so until cooperating releasable detents are engaged. To lower the footrest requires nothing more than the reverse procedure, that is, the pushing of the footrest in a rearward direction until the detents are released. A slight additional push drops the footrest to the lower position.

Still another area of concern resides in the brakes. In the past, the stroller brakes have been somewhat complicated spring-loaded linkages having an over-center position in which a brake shoe is spring-urged against the rear wheel. When new, the prior brakes have functioned reasonably satisfactory, but age and usage affect the articulation of the members and the force which the spring is able to develop to apply the brake shoe against the wheel until the brake becomes less than completely satisfactory.

It has been another objective of the invention to provide an improved brake for walker strollers which is constituted by a single lever pivoted to the structure on which the wheel is mounted, the brake shoe having a lever at one end which is engageable with the wheel tire and which can be forced flush against the tire while the resilience of the rubber permits the tire to be compressed. With this structure, it is actually the resilience of the tire which provides the spring action by which the brake is maintained. The end of the lever remote from the brake shoe is adapted to be engaged by the operator's foot to effect the pivoting of the lever and the disengagement of the brake shoe from the tire. Since the brake requires only a single member and requires no over-center spring action to effect the application of braking force, it is not subject to failure after long usage.

These and other objectives of the invention will become more readily apparent from the following detailed description taken in conjunction with the accompanying drawings in which:

FIG. 1 is a perspective view of the invention,

FIGS. 2, 3 and 4 are diagrammatic views of the frame with the non-frame parts omitted to illustrate the cooperation of the frame elements in folding the stroller, FIG. 5 is a side elevational view of the stroller, FIG. 6 is a side elevational view partly in section illustrating a partially folded condition of the stroller, FIG. 7 is a fragmentary rear elevational view partly in section illustrating the wheel and axle structure and the manner in which it is attached to the frame.

FIG. 8 is a side elevational view of the brake structure,

FIG. 9 is a plan view of the articulated leg joint and releasable lock, taken along line 9—9 of FIGURE 5, FIG. 10 is a cross sectional view taken along line 10—10 of FIG. 9, FIG. 11 is a cross sectional view similar to FIG. 10 with the lock removed to illustrate the articulation of the joint, and FIGS. 12, 13, 14 and 15 are fragmentary perspective views of the footrest mounting structure.

Referring to FIG. 1, the walker stroller is constituted by a frame 20 to which caster-type forward wheels 21 and rear wheels 22 are attached. A seat 23 is supported on the frame and it is adapted to be adjusted from an upright to a reclining position, as is more specifically described in copending application Serial No. 191,887, filed May 2, 1962, and now abandoned. A footrest 24 is also mounted on the frame and is adapted to be moved between an upright position, as shown in FIGURE 1, to a lower position as will be described below. A U-shaped telescoping handle 25 is provided to permit the stroller to be propelled. A removable basket 26 may also be provided for carrying packages.

The frame

The frame 20 comprises a pair of forward legs 30 and a pair of rearward legs 31, one at each side of the stroller, the forward and rearward legs being crossed intermediate their ends and pivoted by a pin 32 to provide a scissors action permitting the stroller to be folded to a flat condition as will be described below. Each rearward leg has an upper section 33 which is pivoted at its upper end 34 by a pin 35 to the front end of a U-shaped seat frame 36. Similarly, each forward leg 30 has an upper section 38 which is pivoted at its upper end 39 by a pin 40 to the rearwardly projecting ends 41 of the U-shaped seat frame 36.

The forward legs are pivoted at their lower ends 44 by a pin 45 to a U-shaped tubular member 46 which forms a forward wheel mount for the wheels 21 and to which a bumper 47 is fixed as by welding or riveting to the tubular member. The tubular member 46 includes rearwardly extending tubes 50, one at each side of the stroller, each of which telescopically and slidably receives a rearward horizontal member 51, the two members 51 forming wheel mounts for the rear wheels 22. The wheels 22 are secured to the ends of an axle 52, the axle passing through the ends 53 of the rearward horizontal members.

The rearward legs 31 have their lower ends 54 secured to the axle 52 as best illustrated in FIGURE 7. The rearward horizontal members 51 and rear legs 31 are spaced from each other by bushings 55 which are slidably mounted on the axle 52.

The upper section 38 of the forward legs 30 is split into an upper part 60, which is integral with the handle 25, and a lower part 61. The two parts are normally joined together by a bifurcated sleeve 62 which is secured by rivets 63 at its lower end to the lower part 61. The upper end of the sleeve 62 is pivotally secured to the upper part 60 by a rivet 64. As best illustrated in FIGURES 9–11, the upper and lower parts 60 and 61 are normally held in alignment by a slidable bolt 67 which is carried in the upper part 60 and is slidable into the position of FIGURE 10 in which its forward end 68 projects into the lower part 61.

A spring 69 has one end 70 bearing against the rivet 64 and the other end 71 inserted into a recess 72 in the upper end of the bolt 67. The spring 69 normally urges the bolt into the locking position of FIGURE 10. An operating knob 74 is fixed by a pin 75 to the bolt 67, the pin riding in a slot 76 in the lower surface of the upper part 60.

The release of the bolt 67 from its position of engagement with the lower part 61, shown in FIGURE 10, is effected by pulling the knob 74 from right to left as viewed in FIGURE 10. When the bolt is slid to the left, the upper part 60, including the integral handle 25, can be pivoted clockwise through an angle of about 170° until the handle lies substantially flat against the forward leg 30 as shown in FIGURE 11. It is this action which effects the folding of the stroller to a collapsed condition. It should be observed that the knobs 74 on each side of the stroller are in an easily accessible position which requires only that the operator lean over slightly, pull the knobs upwardly while pushing the handle forwardly with his arms until the upper and lower parts have been separated and pivoted with respect to each other through a slight angle. Thereafter, folding is completed by pushing forward and down on the handle.

As illustrated in FIGURES 2–4, the pivoting of the upper and lower parts 60 and 61 permits the folding of the upper triangular truss configuration of the frame which is constituted by the seat frame 36 and the two upper leg sections 33 and 38. The folding of the lower triangular truss section constituted by the forward and rearward legs 30 and 31, the tubular member 46 and the rearward telescoping member 51, is permitted by the sliding engagement of the member 51 into the tubes 50. A partially folded condition is illustrated in FIGURE 3. It can be seen by comparing FIGURE 3 to FIGURE 2 that in partially folding, the member 51 has begun to withdraw from the tube 50 on each side of the stroller. Referring now to FIGURE 4, which shows the stroller in a completely folded condition, the member 51 is in a fully extended condition with respect to the tube 50. A spring-urged pin-in-hole lock of the type conventionally used in telescoping handles could be used to fix the member 51 in the tube 50 when the stroller is erect as in FIGURE 2.

When the stroller is in the erect condition of FIGURE 2, the frame elements combine to provide two triangular truss sections which provide a rugged support for the stroller and which tend to relieve the stress normally applied to the intermediate rivet 32 which joins the forward and rearward legs in scissors fashion. The combination of the articulated upper section 38 and the telescoping members 46 and 51 permit the truss sections to be folded with respect to each other to bring the stroller to the flat condition of FIGURE 4.

The brake

The brake is best illustrated in FIGURE 8. As described above, the rearward horizontal member 51 provides a wheel mount for the rear wheels 22 in supporting the axle 52 to which the wheel is secured. The wheel includes a tire 80 which is of an elastically deformable resilient rubber. The brake is a single element lever 81 which is pivoted by a pin 82 on the wheel mount 51. The rearward end of the lever 81 is L-shaped (see FIGURE 1) to provide a flange 83 having a flat surface 84 which acts as a brake shoe. The distance between the pivot axis of pin 82 and the surface 84 is slightly greater than the distance between the pivot axis and the peripheral surface of the tire 80. These dimensions provide that when the lever 81 is in the full line position of FIGURE 8, the brake shoe is pressed into the peripheral surface of the tire 80 which deforms the tire. The deformation of the tire coupled with its resilience provides a spring action tending to hold the brake shoe in the braking position.

The lever 81 has an end 85 remote from the brake shoe 83 which serves as an operating arm for the brake lever 81. When the brake is in operative engagement with the tire, the end 85 projects upwardly above the tire in a position which is easily accessible to the foot of the operator so that it can be depressed, thereby pivoting the brake lever 81 in a clockwise direction to the released position shown in broken lines 86.

Footrest

The footrest 24 is a grill work formed of a plurality of longitudinal extending spaced rods 90 which are welded at their forward ends to a U-shaped frame 91 and to an intermediate transverse rod 92 and a rear transverse rod 93. The U-shaped frame 91 has a lateral rod 94 at each side thereof which is indented at 95 to receive a U-shaped front support 96. The front support 96 has a bight portion 97 which is confined between the longitudinal rods 90 and the indentations 95 to provide a pivot connection of the support 96 with the footrest. The support 96 has lower ends 98 which are pivotally connected to the U-shaped tubular member 46 as illustrated in FIGURE 1.

A U-shaped rear support 99 has ends 100 pivotally engaged on the rearward legs 31. The front and rear supports 96 and 99 respectively are preferably formed of a resilient steel which permits their ends to be pressed toward each other to release them from their pivotal connection to the supporting frame members to effect the removal of the footrest. The rear support 99 has a bight portion 101 on which the rearward end of the footrest is supported. The bight portion 101 is held against the footrest by a pair of laterally spaced Z-shaped rods 102. The bight portion 101 and the Z-shaped rods 102 have cooperating right angle bends 103 and 104 respectively which facilitate a pivoting action between the footrest and the rear support as will be described below.

The rear support has side rods 105 which are indented as at 106 to provide detents which are engageable with studs 107 formed as lateral extensions of the rear transverse rod 93. The cooperating detents 106 and studs 107 provide a releasable lock to maintain the footrest in an upright position illustrated in FIGURE 15.

The forward end of the footrest is formed to provide a shoulder 108 which is engageable with the U-shaped tubular member 46 and, in combination with the rear support 99, supports the footrest in its lower position illustrated in FIGURE 12.

The manipulation of the footrest is quite simple. In moving the footrest from the lower position of FIGURE 12 to the upper position of FIGURE 15, the operator merely pulls upwardly and forwardly on the front end of the footrest. When that upward and forward pull is applied, the rear support swings up in a counterclockwise direction and the forward support 96 swings up in a clockwise direction as viewed in FIGURES 12–15. In the upward movement, as best illustrated in FIGURE 13, the right angle bends 103 and 104 engage each other and cooperate to provide a pivot axis between the footrest 24 and the rear support 99 and guide the footrest through the proper movement. In FIGURE 14, the footrest is shown in its uppermost position in which it is horizontal and the bent bight portion 101 and rod 102 are lying in horizontal planes. The spacing of the rod 102 from the footrest rods 90 permits the footrest to be slid in a forward direction with respect to the rear support 99. In moving forward, the studs 107 slide under the detents until the footrest is brought to the position of FIGURE 15. There, engagement of the studs 107 with the detents 106 holds the footrest in the elevated position of FIGURE 15.

To return the footrest to its lower position, the reverse of the operation just described is performed. The footrest is slid rearwardly until the studs 107 ride under the detents 106 to the position of FIGURE 14. Thereafter, all that is required is a little shove and the front and rear supports 96 and 99 pivot through the position of FIGURE 13 to the position of FIGURE 12 wherein the footrest is held in a lower position by the rear support 99 at the rear end and by the engagement of the shoulder 108 with the tubular member 46.

Operation

In the operation of the invention, the stroller is normally in the erect position of FIGURE 1. The telescoping handles can be extended or retracted to a desired height for convenience of operation. The stroller is rolled about on its wheels and the vibrations and bumps occurring through the engagement of the bumper 47 with any obstacles are absorbed primarily by the tubular member 46 and the rear horizontal members 51. While the members 46 and 51 are free to telescope with respect to each other during normal operation, thereby permitting a stress to be applied to the intermediate rivet 32, the frictional engagement of the members 51 with respect to the tubes 50 absorbs the greatest part of the shock and vibration and relieves the stress on the intermediate rivet 32.

When the stroller is to be folded, the joint on the upper section 38 on each side of the stroller is broken and the handle is swung in a forward direction until it folds flat against the forward legs 30. In the flat condition the stroller can be conveniently transported or stored.

I claim:
1. In a walker stroller having at each side a pair of crossed legs and wheels mounted adjacent the lower ends of said legs, and a seat supported by said legs, a foot supporting structure comprising,
    a generally planar, normally horizontal foot rest,
    at least one elongated front support pivoted at one end adjacent the lower end of a forward leg and at the other end to said foot rest,
    a U-shaped rear support having free ends pivotally connected to said legs and having a bight portion slidably receiving said foot rest,
    cooperating detent means on said rear support and foot rest respectively for releasably holding said foot rest in an elevated horizontal position.

2. In a walker stroller having at each side a pair of crossed legs and wheels mounted adjacent the lower ends of said legs, and a seat supported by said legs, a foot supporting structure comprising,
    a generally planar, normally horizontal foot rest,
    at least one elongated front support pivoted at one end adjacent the lower end of a forward leg and at the other end to said foot rest,
    a U-shaped rear support having side rods whose free ends are pivotally connected to said legs and having a bight portion slidably receiving said foot rest,
    transversely projecting studs on the rearward end of said foot rest,
    said side rods having detents engageable with said studs when said foot rest is elevated and pulled forwardly to hold said foot rest in a forward elevated position.

3. A walker stroller comprising,
    a pair of crossed legs at each side of said stroller and pivoted together intermediated their ends in scissors fashion,
    forward horizontal tubular members on each side of said stroller,
    means pivoting the forward ends of said legs to said forward horizontal tubular members,
    a generally planar, normally horizontal foot rest,
    at least one elongated front support pivoted at one end to said horizontal tubular member and at the other end to said foot rest,
    a U-shaped rear support having free ends pivotally connected to said legs and having a bight portion slidably receiving said foot rest,
    cooperating detent means on said rear support and foot rest respectively for releasably holding said foot rest in an elevated horizontal position,
    a pair of front wheels mounted on said forward members,
    rearward horizontal members on each side of said stroller telescoping slidably into said forward members,
    means pivoting the rearward ends of said legs to said rearward horizontal members, rear wheels mounted on said rearward members,
a lever pivoted intermediate its ends to one of said rearward horizontal members,
a brake shoe at the end of said lever adjacent said wheel,
the distance between said lever pivot and said brake shoe being slightly greater than the distance between said lever pivot and the peripheral surface of said tire,
the end of said lever remote from said shoe providing a brake release arm.

References Cited by the Examiner

UNITED STATES PATENTS

| | | | |
|---|---|---|---|
| 2,244,155 | 6/1941 | Hendrickson et al. | 280—36 |
| 2,341,117 | 2/1944 | Reinholz | 280—36 X |
| 2,471,004 | 5/1949 | Moster | 280—36 |
| 2,517,443 | 8/1950 | Rhodes et al. | 280—36 X |
| 2,886,337 | 5/1959 | Quisenberry | 280—36 |
| 3,019,028 | 1/1962 | Hedstrom | 280—36 |
| 3,063,729 | 11/1962 | Hamilton | 280—36 |
| 3,075,783 | 1/1963 | Flam | 280—36 |
| 3,110,504 | 11/1963 | Meyers | 280—36 |

ARTHUR L. LA POINT, *Primary Examiner.*